Dec. 8, 1953  I. JEPSON  2,662,194
ELECTRIC MOTOR FOR SHAVERS AND THE LIKE
Filed Oct. 31, 1947  3 Sheets-Sheet 2
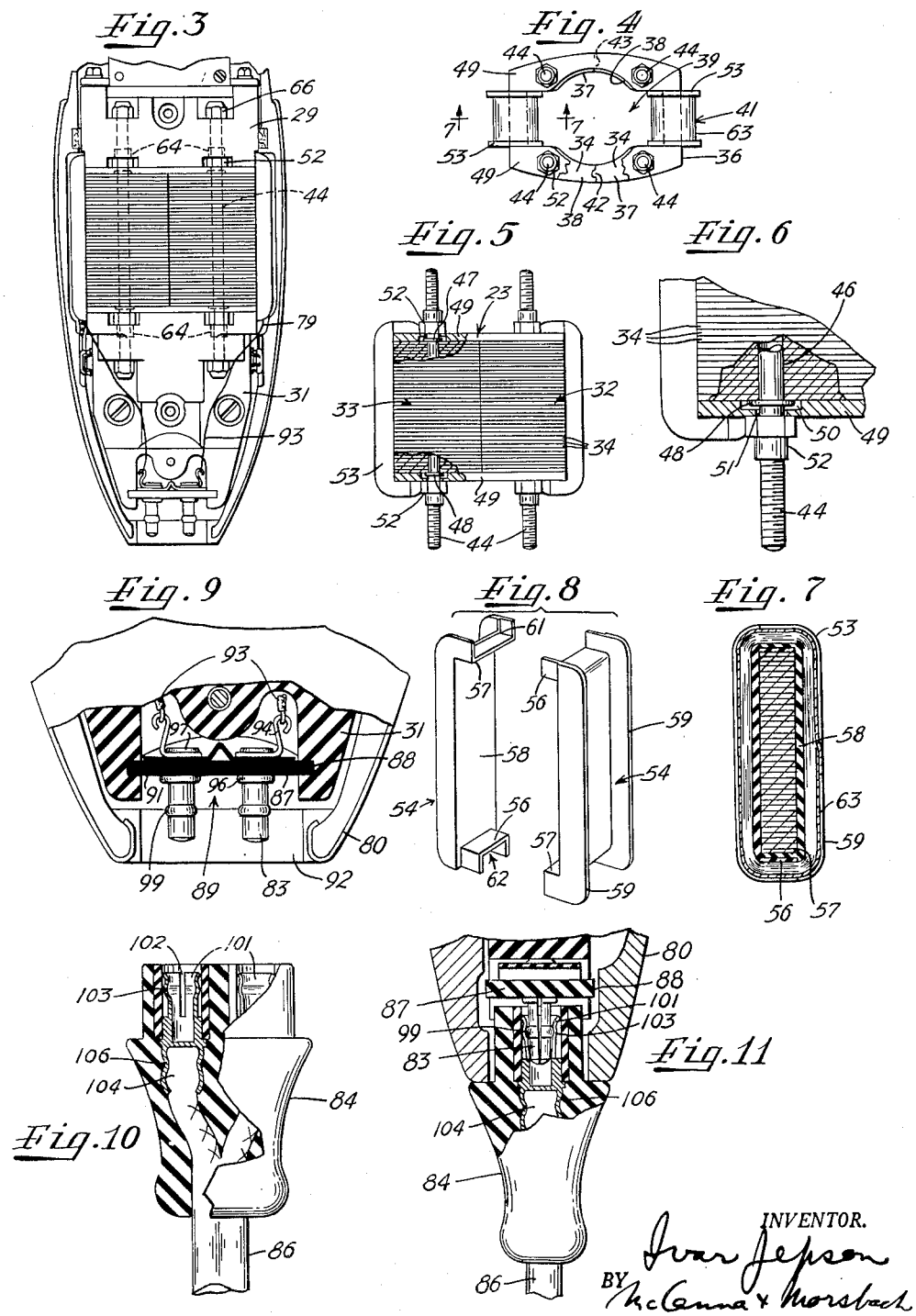

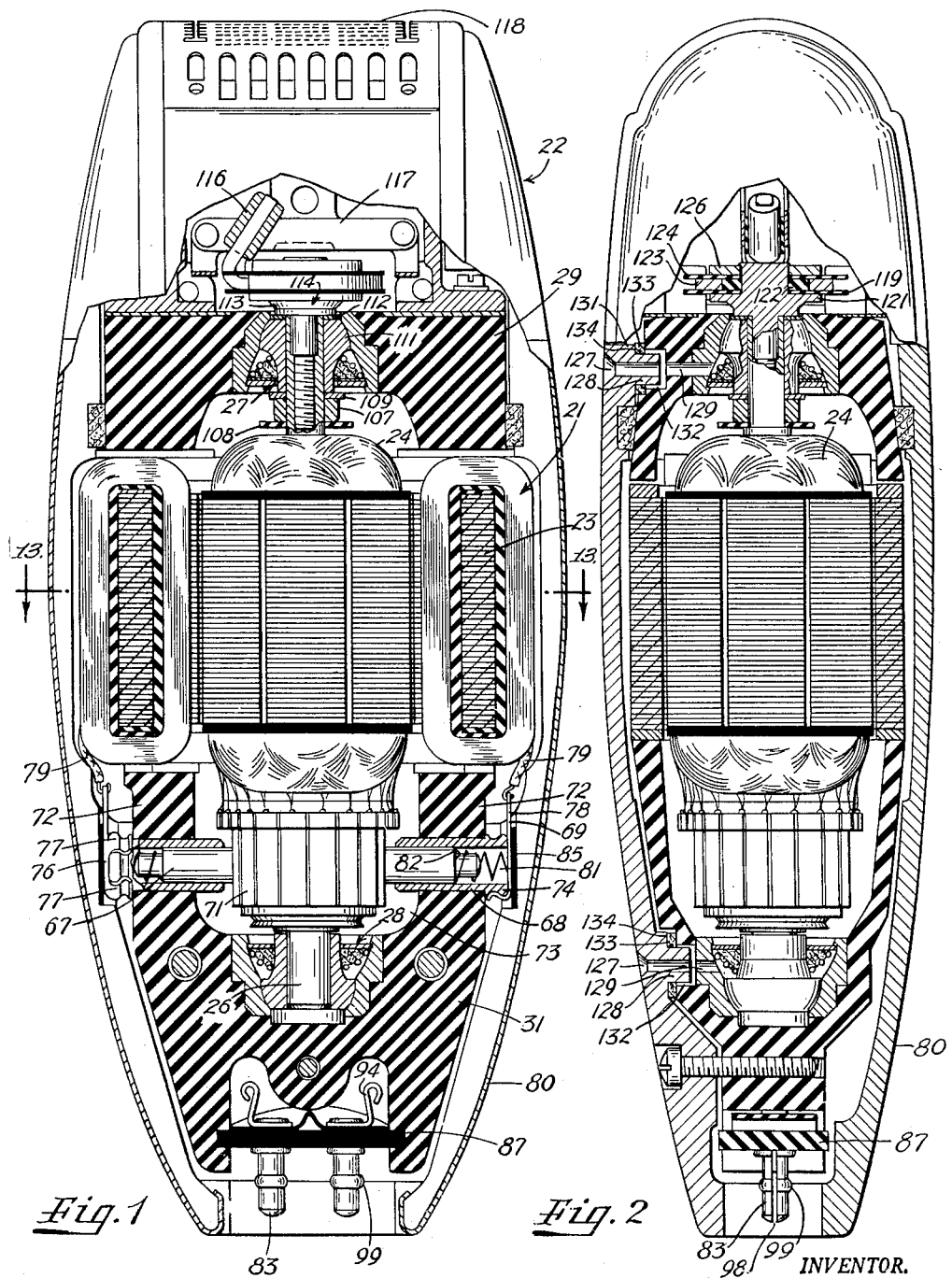

Dec. 8, 1953     I. JEPSON     2,662,194
ELECTRIC MOTOR FOR SHAVERS AND THE LIKE
Filed Oct. 31, 1947     3 Sheets-Sheet 3
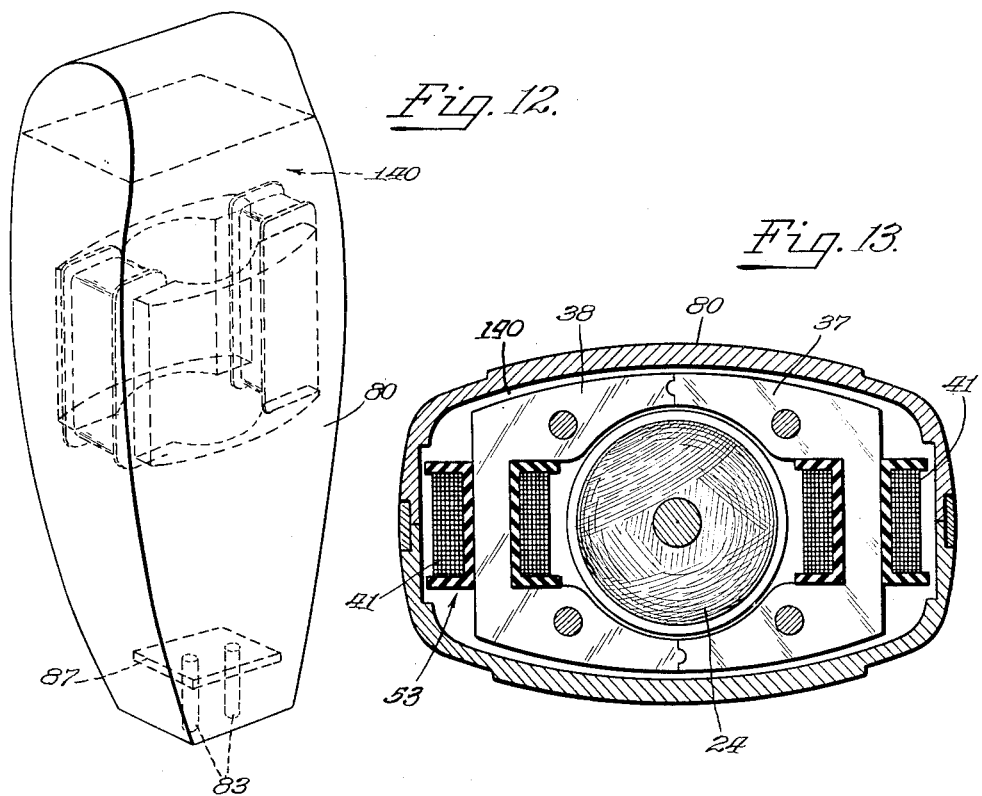
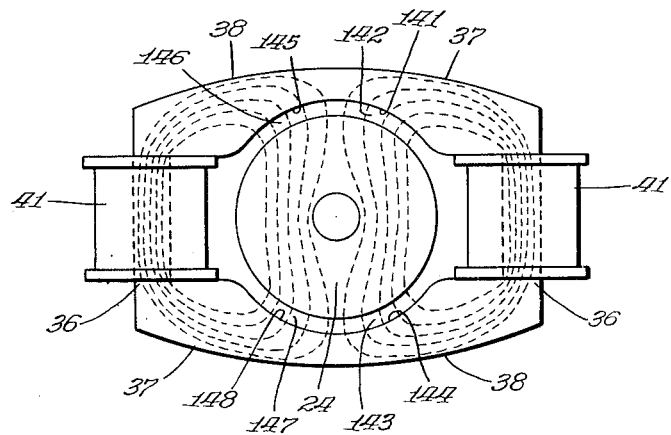
INVENTOR.
Ivar Jepson
BY McCanna & Morsbach
Attys.

Patented Dec. 8, 1953

2,662,194

UNITED STATES PATENT OFFICE 2,662,194

ELECTRIC MOTOR FOR SHAVERS AND THE LIKE

Ivar Jepson, Oak Park, Ill., assignor to Sunbeam Corporation, Chicago, Ill., a corporation of Illinois Application October 31, 1947, Serial No. 783,419

6 Claims. (Cl. 310—50)

This invention relates to electric motors and more particularly to motors of the type used in electric shavers, small hand power tools, and the like.

Heretofore, conventional universal electric motors of the rating contemplated herein have been generally circular in cross section; consequently, to provide a snug fitting external casing of minimum material such as used in an electric shaver the casing was also generally circular in shape. However, circular shaped casings have not in general been entirely satisfactory for electric shavers and the like. This is due to reasons, among others, of the difficulty in providing a universal motor (as distinguished from an impulse type motor) having sufficient power for a casing size small enough to be conveniently held in the hand, and to the tendency of the casing to roll off a supporting surface such as a shelf or table and damage the motor unit.

A primary object of the invention is, therefore, to provide an improved electric motor of the universal, commutator, series wound type as distinguished from impulse type motors, having such novel construction characteristics as to make it suitable for operating a hand implement such as an electric shaver housed in a flat shaped casing which may be conveniently held in the hand.

Another object is to construct a motor of the above character which is small and compact, which is mechanically strong, which can be readily assembled so that the component parts are positively and accurately positioned and which can be manufactured in a relatively inexpensive manner.

Another object is to provide a motor of the above character with an improved field assembly construction that can be quickly and easily assembled with a minimum of effort.

Another object is the provision in a motor of the above character having a field structure with a novel construction for field coil spools that simplify the manufacturing thereof and facilitates assembly of the spools on the laminated field structure.

Another object is the provision in a motor circuit of novel means for effecting an electrical connection between a brush holder assembly and the motor circuit that facilitates maintenance, that is easy to manufacture, that can be easily assembled.

Another object is to provide a novel means for connecting the motor with an external source of power that assures a positive electrical connection under all conditions of use.

Other objects and advantages of the invention will become apparent from the following detailed description taken in connection with the accompanying drawings, in which—

Figure 1 is a side view of an electric razor having a cutaway portion showing a section of a motor embodying my invention;

Figure 2 is an end view of the electric razor with a cutaway portion;

Figure 3 is an elevational view similar to Figure 1;

Figure 4 is an end view of the field structure before assembly of the motor;

Figure 5 is a plan view of Figure 4;

Figure 6 is an enlarged fragmentary sectional view showing details of construction of the field structure;

Figure 7 is a sectional view taken substantially along the line 7—7 of Figure 4;

Figure 8 is a perspective view of parts forming a field coil spool;

Figure 9 is a cutaway sectional view showing the power terminals;

Figure 10 is a cutaway sectional view of an attachment plug for use with the power terminals shown in Figure 9;

Figure 11 shows the attachment plug connected to the power terminals;

Figure 12 is a diagrammatic view illustrating the novel relationship between the motor and the shaver as a unit;

Figure 13 is a sectional view taken substantially along the line 13—13 of Figure 1; and Figure 14 is a diagrammatic view illustrating the flux distribution in the motor.

Referring now to the drawings, the invention is shown embodied in a small compact motor 21 for use with an electric shaver 22 of the type used in shaving beards and the like. It is to be understood that the motor can be used as the motivating power in any small power tool and that the use of the motor in the shaver 22 is by way of illustration only. The motor includes a field structure 23 composed of a plurality of pieces secured together to form a unitary structure of generally elongated rectangular shaped cross section encircling the armature 24. The latter is supported by a shaft 26 suitably journaled in self-alining bearings 27 and 28 supported in bearing block supports 29 and 31 secured in a suitable manner to opposite ends respectively of the field structure 23.

One phase of my invention is concerned with forming a laminated field structure for small power motors such that the structure can be constructed with a minimum number of different parts and at the same time can be quickly and easily assembled in a rigid mechanically strong relation. For this purpose the field structure 23 comprises two parts 32 and 33 (see Figs. 4 and 5) abutting each other along spaced edge portions shaped to provide an interlocking fit and means for securing the respective parts 32 and 33 in an assembled relation to form a unitary field structure. Each of the parts 32 and 33 is identical and comprises a plurality of stampings 34 secured in side by side relation to form the laminated field structure. The stampings 34 as best seen in Fig. 4 are generally U-shaped and comprise a central portion 36 having arms 37 and 38 integral therewith extending outwardly from the central portion 36 in spaced relation. Preferably the outer portion of the arms 37 and 38 is formed so that when the respective parts 32 and 33 are assembled a suitable opening 39 is formed in the field structure for the reception of the armature 24. It is to be understood that the dimensions of the opening 39 in the structure are dependent on the rating of the motor, the air gap between the armature 24 and the field structure 23, and the like, all of which must be taken into consideration in the construction of a motor in accordance with practice well known in the art. The arms 37 and 38 are of such length that space is provided between the opening 39 for the armature 24 and the central portion 36 of the stampings 34 for the reception of a field coil 41 utilized for energizing the field structure during operation of the motor.

At its extreme outer end each arm 37 is formed with a projection 42. In a similar manner each arm 38 is formed with a recess 43 shaped to receive a projection 42 of the same shape as the projection formed on the arm 37. In assembling the parts 32 and 33 the metal stampings 34 are preferably positioned so that the arms 37 with the projections 42 are alined and the arms 38 with the recesses 43 are alined. While any suitable means can be utilized for securing the respective laminations 34 of each part 32 and 33 in a tightly assembled relation, I prefer to stack the laminations 34 in a side by side relation and pass two spaced studs 44 through openings 46 formed in the laminations and provide abutments 47 and 48 on the elongated studs 44 that engage opposite ends of the laminated structure 23. It is to be understood that the spaced openings 46 through which the studs project are substantially the same dimensions as the studs and may be formed in the respective laminations during their forming process. Preferably the openings 46 are formed adjacent the interconnection between the arms 37 and 38 and the central portion 36 which is of relatively large cross section to insure that the flux density in the magnetic circuit is not unduly increased. To simplify manufacturing, the studs 44 are preferably preformed with an annular shoulder which forms the abutment 47 at one end. When the desired number of laminations 34 are in a stacked relation the laminations are placed under pressure and a portion of each stud adjacent the opposite end is deformed to form the abutment 48 that engages the opposite end of the stacked laminations 23. This construction assures that the laminations 34 on each part 32 and 33 are held in a rigid tightly assembled relation at all times and under all service conditions.

The respective parts 32 and 33 may be secured together in any suitable manner to form a unitary field structure 23. I prefer to utilize links 49 at opposite ends of the field structure 23. The links are formed with spaced apertures 51 for receiving the studs 44 passing through each respective part 32 and 33. Each link thus interconnects two studs 44. As shown in Figure 4 one link 49 connects the upper studs 44 together and one link 49 connects the lower studs 44 together. The links 49 are secured in a tightly assembled relation with the field structure 23 by nuts 52 threaded on the studs 44. As best shown in Figure 6 each of the links 49 is formed with a counterbore 50 on one side shaped to receive the respective abutments 47 and 48 formed on the studs 44 with a clearance fit and thereby permit the links 49 to abut against the end laminations 34 of the field structure 23.

Another phase of my invention is directed to an improved construction of a spool 53 for the field coils 41 that facilitates assembly of the respective components of the motor particularly where the laminations 34, and the field structure 23 are of the shape hereinbefore described. Thus it contemplates a spool 53 formed in two separable identical parts 54 each having spaced abutting edge portions 56 and 57 which when joined together interlock to form a unitary spool 53 having smooth external surfaces encircling the field structure 23. Preferably the respective parts 54 are formed from suitable insulating material. As best seen in Figure 8 each part 54 comprises a central portion 58 to which is integrally connected the edge portions 56 and 57 at opposite ends thereof. Each part 54 is generally of a U-shaped cross section having spaced ribs 59 integral with and projecting outwardly along opposite sides of the central portion 58 and the edge portions 56 and 57 respectively to form side members for the unitary spool 53. On the edge portion 57 the exterior surface of the edge portion and the inner portions of each rib 59 facing each other are fashioned so as to form a groove 61, while on the edge portion 56 an exterior surface of each rib 59 and the inner surface of the edge portion 56 are shaped to form a tongue 62 that will snugly fit in a groove 61 of the same shape as formed on the edge portion 57. The preshaping of the edges 56 and 57 and the associated ribs 59 is such that when the respective parts 54 are interlocked to form the spool 53 the thicknesses of the overlapping portions of the respective edges 56 and 57 and the overlapping portions of the ribs 59 are such that the thickness of the ribs and the sleeve of the spool are substantially uniform throughout the periphery of the assembled spool. Thus, there will be no rough or sharp surfaces that will cause abrasion or damaging of the insulation on the field coils.

In assembling the spool 53 on the laminated structure 23 one part 54 of the spool is positioned so as to straddle the alined central portions 36 of the assembled stampings and the other part is then positioned so it straddles the laminated structure from the opposite side thereof. The parts are alined so that the respective tongue 62 of each part 54 interfits with the groove 61 of the other part 54. To insure that the parts 54 remain in an assembled position a drop or two of acetone in case the spool is formed from plastic material or other solvent, as required, depending upon the material used, may be placed between the interlocking joints of the parts 54. The reaction between the solvent and the material of the spool is such as to effect a tight joint of the respective parts 54. Preferably the overall dimensions of the spool 53 are such that the ribs 59 fit snugly against the arms 37 and 38 of the laminations 34. The dimensions of the edge portions 56 and 57 and the central portion 58 should preferably be such that a snug fit is assured between the respective parts 54 and the laminated structure 23. It is to be understood that these dimensions depend on the motor rating and the like and are necessarily determined for each motor rating.

After the spool 54 is formed on the laminated structure 23, the field coil wire is wound around the spool in its assembled position. The number of turns of wire for each field coil 41 of course is dependent upon the required field flux for each motor. This depends on the motor rating and can be readily determined by those skilled in the art for each individual motor rating. As soon as the required number of turns of wire are wound on the spool 53, a layer or so of insulating tape 63 is wrapped around the outer periphery of the wire to provide additional protection for the field coil 41.

The bearing blocks 29 and 31 (see Fig. 3) are alined on opposite ends of the field structure 23 so that the armature 24 is accurately positioned in the opening 39 when the respective blocks 29 and 31 are secured to the field structure 23. To this end the respective blocks 29 and 31 are supported by the studs 44 utilized for securing the laminations 34 together and the nuts 52 for securing the links 49 to the assembly. Thus after the links 49 have been secured in position the respective nuts 52 are hollow milled to predetermined dimensions. The hollow milled portion of each nut 52 is accurately located with repect to the central axis of the opening 39 in the field structure 23. In a similar manner the bearing supports 29 and 31 are formed with openings 64 shaped to snugly fit with the hollow milled portion of the respective nuts 52. Thus when the bearing blocks 29 and 31 are pulled into position by nuts 66 in the assembly of the respective parts the bearings 27 and 28 (see Figures 1 and 2) supported in the respective blocks 29 and 31 are positively and accurately located so that the proper air gap exists between the armature 24 and the field structure 23.

The universal motor, operative on either alternating or direct current power, shown herein, is a series motor of the commutating type. One phase of my invention is concerned with means for effecting a connection between brushes 67 and the motor circuit that facilitates assembly and maintenance of the motor. For this purpose I utilize tubular shaped brush holders 68 (see Figure 1) shaped to hold the brushes 67 and provide a removable cap 69, electrically connected in the motor circuit, shaped to fit over the end of the tubular members 68 to effect a connection between the brush holder 68 and the motor circuit. As best seen in Figure 1 the motor shown herein utilizes two brushes 67. The brushes are received in the brush holders 68 herein in the form of sleeves 68 supported by the bearing block 31 so that one end of each sleeve is disposed adjacent a commutator 71 and the other end projects through a wall 72 of a commutator chamber 73 formed in the bearing support 31. The sleeves 68 are disposed on opposite sides of the commutator 71 in a predetermined manner to obtain proper commutation. The outer end of each sleeve 68 is formed with a bead 74. The cap 69 herein is formed with a central portion 76 and depending resilient fingers 77 shaped to interfit with the bead 74 so as to secure the cap 69 to the end of the sleeve 68. A portion 78 of each cap 69 is shaped so that field leads 79 can be secured thereto as by hooking an end of each lead 79 through an opening in the portion 78 and soldering the respective parts together. The pressure of each brush 67 on the commutator is determined by a spring 81 disposed between a shoulder 82 formed on the brush 67 and the cap 69. This construction is advantageous in that the electrical connections and the brushes are readily accessible from the exterior of the motor for maintenance and service purposes. It also permits the use of a relatively long spring 81 between the brush 67 and the cap 69 which is desirable since the longer the spring the less variation there will be in brush pressures on the commutator as the brush 67 wears down in use. In some applications such as when the motor is used in a housing 80 which is formed by separable parts joined together as described in my co-pending application, Serial No. 782,762, I utilize a strip of mica insulation 85 between the cap 69 and the housing 80. This provides additional protection to the user of the motor against induced voltages in the motor and the like.

Frequently in electric razors and power tools the construction of power terminals 83 and a plug 84 for connecting the respective terminals to a source of power is such that a positive connection between the respective parts is not always assured. This is aggravated by the fact that in operation, particularly where the power terminals are located at a lower portion of the electric razor or tool when it is being used, the weight of the plug 84 and connected cord 86 tends to pull the plug 84 from engagement with the terminals 83. Accordingly my invention is concerned with a construction of the power terminals 83 and the plug 84 that positively assures an electrical connection between the respective parts under extreme service conditions. To this end the power terminals 83 are formed as elongated prong members projecting through an insulating panel 87 (see Figs. 9, 10 and 11) slidably disposed in spaced opposed grooves 88 formed on opposite sides of a recess 89 surrounding the terminals 83 at the extreme outer end of the bearing block 31. As shown in Fig. 9 the recess 89 is disposed so that the terminals 83 are accessible from the exterior of the motor housing 80 through an opening 92 formed therein. Field leads 93 are connected to the terminals 83 through eyelets 94 embracing one end of the terminals 83. Herein the eyelet 94 is disposed between an insulating member 91 on one side of the insulating panel 87 and a peened end 97 of each terminal 83. The peened end 97 in effect forms a riveted connection which, coacting with an annular shoulder 96 formed on the opposite side of the insulating panel 87, secures the terminals thereto in a rigid relation. The end of each terminal 83 projecting into the recess 89 is formed with an axially extending slot 98 (see Fig. 2) that substantially bisects the terminal. With this construction each of the bisected parts of the terminal is slightly resilient and when in use with a proper plug 84 will be stressed so that the outer ends of each bisected terminal are moved toward each other as shown in Fig. 11 in a stressed condition. Intermediate the ends of the terminals 83 the latter are deformed as by forming an annular bead 99 thereon. The plug 84 as best seen in Figs. 10 and 11 comprises two sleeve-like members 101 suitably mounted in a preshaped support of suitable insulating material shaped to interfit in the opening 92 formed in the housing 80 and the recess 89. Each of the sleeve members 101 is formed with axially extending slots 102 that permit the sleeve parts to be spread apart under tension when the prongs 83 are inserted in the ends of the sleeve 101. Preferably the sleeve 101 is deformed as by forming an annular groove 103 at an intermediate portion thereof which when the sleeves 101 engage the prongs 83 in an operative relation receives the bead 99 formed on the prongs. The opposite end of each sleeve member 101 is shaped to receive the end 104 of a cable 86 adapted for connection to a power source. To assure a positive electrical connection between the sleeves 101 and the ends of the cable 104, the end 106 of each sleeve 101 may be crimped as shown in Fig. 10.

In some motor applications the external movement and the end play of the armature 24 and associated shaft 26 must be maintained within extremely close tolerances to insure optimum operation. A construction for minimizing the end play of the armature 24 when the motor is used for driving an electric razor 22 is shown in Figures 1 and 2. Thus, an abutment 107 is formed on the shaft 26 as by a collar being press fitted on the shaft adjacent an insulating disc 108 disposed adjacent the bearing 27. A washer 109 is disposed between the collar 107 and a sleeve member 111 of the self-alining bearing 27. A second washer 112 is disposed between the opposite end of the sleeve member 111 and a shoulder 113 formed on an eccentric shaft 114 rigidly mounted on the shaft 26. The washers 109 and 112 are selectively chosen during assembly of the motor so that only washers of the thickness necessary to permit the shaft 26 to freely rotate without appreciable end play are used in the assembly.

Any desired drive connection can be secured to the shaft 26. Thus, as shown herein by way of illustration an eccentric 116 is mounted on the shaft 114 threaded into one end of the shaft 26 and engages the drive bracket 117 of the electric razor 22 for driving the cutter blade thereof, not shown. The eccentric 116 is preferably insulated from the armature 24 so that induced voltages in the shaft 26 are prevented from passing to the housing 80 and a comb 118 mounted at one end of the housing. As shown, a washer 119 (see Figures 1 and 2) of insulating material is disposed on a shoulder 121 formed on the eccentric shaft 114. A second washer 122 of smaller diameter overlies the washer 119. The outer periphery of the washer 122 is preferably of an out-of-round preshape. A steel washer 123 supporting the eccentric 116 is provided with an opening of the same shape as the outer periphery of the washer 122 so that the washer 122 is snugly received in the opening in the washer 123 when the parts are assembled as shown in Fig. 2. Preferably the washers 122 and 123 are of substantially the same thickness. A washer 124 is mounted to overlie both the insulating washer 122 and the eccentric washer 124. A washer 126 is mounted on the outer end of the eccentric shaft 114 and the latter is peened over to secure the washer 126 on the shaft 114 and thereby retain the respective parts in a tightly assembled relation.

Suitable provision is made for oiling the motor bearings from the exterior of the housing 80 in which the motor is supported. For this purpose passageways 127 formed in bosses 128 on the interior of the housing 80 are positioned to form a continuation of the passageways 129 in communication with the bearings 26 and 27 and extending through the bearing blocks 39 and 29 respectively. To facilitate alinement of the passageways each boss 121 is shaped to interfit in a recess 132 at one end of the passageway 129 formed in the respective bearing block. The recesses are somewhat larger than the bosses so as to allow for tolerances in manufacture. To prevent leakage of oil from the passageways to the field structure a gasket 133 is disposed between a shoulder 134 formed on the boss and each respective bearing block.

Referring now more particularly to that phase of my invention dealing with the shape of the motor and the casing to provide the desired flat configuration together with motor characteristics for power and efficiency in operating a shaver of the oscillating cutter type, or for similar work, reference is made to Figures 12, 13, and 14. The motor is of such external configuration, consistent with performance requirements, that it can be readily disposed in a rectangular shaped casing having a chamber 140 with a generally rectangular cross section, being of the largest dimensions at its central portion and tapering on each side thereof towards the ends of the casing, as shown in Figure 12. This is accomplished by constructing the field structure in two U-shaped parts which when assembled together in matching relation form a unitary field structure having a generally rectangular cross section as hereinbefore described. Flux for the motor is supplied by two coils, one being disposed on each of the shorter sides of the rectangular field structure. This construction in effect provides two separate fields supplying the total flux required for efficient operation of the motor, as shown in Figure 14. Thus the flux produced by the coil mounted on the right side of the structure follows the path formed by the central portion 36, the leg 37, the pole face 141, herein formed by the arcuate shaped outer end of the leg 37, an air gap 142 through the armature 24, an air gap 143, a pole face 144 herein formed by the arcuate shaped outer end of the leg 38 and thence through the leg 38 to the central portion 36. In a similar fashion the flux produced by the coil mounted on the left side of the structure shown in the Figure 14 follows the path formed by the central portion 36, the leg 38, a pole face 145, an air gap 146 through the armature 24, an air gap 147, the pole face 148, back through the leg 37 to the central portion 36 with the coils wound so that the flux follows the paths as described above. It will be seen that the pole faces 141 and 145 are of the same polarity and the pole faces 144 and 148 will be of the same polarity. It is to be understood that so disposing the field coils on the field structure the thickness of the field structure is maintained at a minimum whereas the overall width of the field structure is increased to some extent by the field coils. This latter is desirable in providing a mounting for the brush assembly. To obtain longer life of brushes, consistent with performance, it is necessary to provide a brush holder that permits considerable automatic adjustment of the brushes. As fully described hereinbefore my brush holders are formed by tubular members 68 inserted in the bearing block 31 on opposite sides of the armature. By disposing these tubular members in the same plane of the field structure as the coils I provide a brush holder with a spring sufficiently long that it has the proper characteristics to assure constant brush pressure as the brush wears away due to engagement by the armature. It will also be noted that the armature is positioned on the side of the motor remote from the head. Heretofore, in constructions of this type the armature was mounted on the shaft adjacent to the driving end of the shaft. The eccentricity developed by the shaft in such constructions caused wearing of the bearings, affected the brush engagement with the armature to such an extent that there was a considerable amount of undesired sparking. By disposing the armature as described above, the effect of the eccentricity of the shaft due to wear of the bearing adjacent to the driving end thereof is minimized and consequently undesired sparking of the brushes is minimized.

It is to be understood that the field structure together with the insulation blocks is a self-contained unit and that the motor can be tested as such before it has been assembled in the housing 80. Any suitable means may be utilized for mounting the motor in its housing 80. One such construction is fully described in my co-pending application, Serial No. 782,762, filed October 29, 1947. It is to be understood that the motor mounting in each instance will depend on the application and the shape of the tool or implement in which it is to be used. It is also to be understood that any of the parts such as the shape of the bearing blocks 29 and 31 can be readily modified to suit any individual application.

While I have shown one embodiment of my invention it will be understood that I do not wish to be limited thereto since many modifications may be made, and I therefore contemplate by the appended claims to cover such modifications as fall within the true spirit and scope of my invention.

I claim:

1. A motor unit having a hand grip casing of substantial length in relation to its width and thickness, an armature disposed lengthwise within said casing, a field structure within said casing surrounding the armature having a substantially rectangular cross section conforming with the width and thickness of the casing, insulation supporting blocks on opposite ends of said field structure and clamped directly thereto independently of said casing, an implement head having a substantially rectangular base section mounted on one of the supporting blocks at the outer end thereof, a current supply connector of substantially rectangular cross section at the end of the casing opposite from said implement head, the casing having an exterior configuration generated by tying the four corners of the implement head cross section at one end with the four corners of the field cross section at the center and with the four corners of the connector cross section at the opposite end to provide a flat hand grip casing.

2. A motor unit having a hand grip casing provided at one end with an implement drive and at the opposite end with a current supply, a universal motor within the medial portion of the casing having an armature extending lengthwise within the casing and having a commutator at its end adjacent to the current supply end, a generally rectangular shaped field structure having long and short sides, field coils encircling said short sides, the armature being disposed in said field structure, insulation supports secured to said field structure at opposite ends thereof independently of said casing for rotatably supporting the armature, one of said supports enclosing said commutator, a brush holder assembly mounted on each side of said latter support, a brush disposed in each of said holders to engage said commutator on diametrically opposite sides, said holder being disposed in a plane normal to said short sides of the field structure, the overall dimensions in a plane through the brush holder assemblies being less than the overall dimensions through a cross section plane of the field structure including the field coils.

3. A motor comprising an armature having a shaft, a two part laminated field structure comprising laminations having a central portion and spaced arms projecting outwardly therefrom, one of said arms having a recess formed thereon and the other of said arms having a projection formed thereon shaped to interfit with a recess of the same shape as formed on the first arm, the laminations of each part being positioned so that the projections are alined on one side of the part and the recesses are alined on the opposite side of the part, said parts being arranged so that the alined projections of one part interfit with the alined recesses in the other part, said laminations being shaped so that in the assembled position of the parts an opening is formed for said armature, field coils encircling said field structure at spaced positions for energizing said field structure, bearings for supporting said shaft, bearing supports disposed on opposite ends of said field structure, and means for clamping the bearing supports to the field structure in a tightly assembled relation independently of any other structure associated with said motor whereby to positively aline said armature with respect to said field structure.

4. A motor comprising an armature having a shaft, a two part laminated field structure comprising laminations having a central portion and spaced arms projecting outwardly therefrom, one of said arms having a recess formed thereon and the other of said arms having a projection formed thereon shaped to interfit with a recess of the same shape as formed in the first arm, the laminations of each part being positioned so that the projections are alined on one side of the part and the recesses are alined on the opposite side of the part, said parts being arranged so that the alined projections of one part interfit with the alined recesses in the other part, said parts being shaped to form a central opening for said armature, opposed spaced links at opposite ends of said parts holding said parts in position to form a unitary structure, field coils encircling said field structure at spaced positions for energizing said field structure, bearings for supporting said shaft, bearing supports disposed on opposite ends of said field structure, and means independently of any other structure of said motor for clamping the bearing supports to the field structure in a tightly assembled relation.

5. An electrical insulating spool of the type used for field coils embracing a yoke or the like, comprising two separable pieces, each of said pieces comprising a member having a central portion and outwardly projecting edge portions, said portions having spaced ribs formed thereon along opposite sides, one of said edge portions and the associated ribs being fashioned to form a groove and the other of said edge portions and the associated ribs being fashioned to form a tongue shaped to fit snugly in a groove of the shape formed in the first edge portion, said members being so dimensioned that with the tongue of one member interfitting with the groove of the other and the tongue of the other interfitting with the groove of the first, they form a spool of predetermined shape, shaped to encircle the yoke and having a smooth exterior surface upon which wire may be wound to form a field coil.

6. In a field assembly, a two part separable field structure composed of a plurality of laminations comprising a central portion and outwardly extending arms integral with opposite ends of said central portion, one of said arms being formed with a recess and the other of said arms being formed with a projection shaped to interfit with the recess of the same shape as formed on the first arm, the laminations in each of said parts being positioned so that the recesses at one side of the laminations are in alinement and the projections on the opposite side of the laminations are in alinement, an insulating spool shaped to encircle the central portion of each part, and comprising two identical members shaped to interlock along abutting edge portions to form a unitary spool, each of said members comprising an edge portion having a groove formed thereon and an opposite edge portion shaped to fit snugly in a groove of the same shape as formed on the first edge portion, said members when joined together forming a spool having a smooth exterior surface for the reception of wire for field coils, and links disposed on opposite ends of said parts for securing the parts together to form a unitary structure so that the projections of each part interfit with the recess of the other part in the assembled structure.

IVAR JEPSON.

References Cited in the file of this patent

UNITED STATES PATENTS

| Number | Name | Date |
|---|---|---|
| 415,749 | Thomson | Nov. 26, 1889 |
| 495,562 | Perret | Apr. 18, 1893 |
| 518,561 | Brown | Apr. 17, 1894 |
| 577,480 | Gutman | Feb. 23, 1897 |
| 916,961 | Anderson | Apr. 6, 1909 |
| 1,229,694 | Winter | June 12, 1917 |
| 1,513,583 | Conner | Oct. 28, 1924 |
| 1,774,998 | Schroeder | Sept. 2, 1930 |
| 1,822,859 | Perkins | Sept. 8, 1931 |
| 2,039,456 | Sammarone | May 5, 1936 |
| 2,181,418 | Cohen et al. | Nov. 28, 1939 |
| 2,229,977 | Kenyon | Jan. 28, 1941 |
| 2,233,623 | Miner et al. | Mar. 4, 1941 |
| 2,234,926 | Jepson | Mar. 11, 1941 |
| 2,237,868 | Roggenstein | Apr. 8, 1941 |
| 2,238,696 | Hanley | Apr. 15, 1941 |
| 2,243,878 | Martin | June 3, 1941 |
| 2,264,033 | Youhouse | Nov. 25, 1941 |
| 2,406,389 | Lee | Aug. 27, 1946 |
| 2,429,793 | Benander | Oct. 28, 1947 |
| 2,477,150 | Snyder et al. | July 26, 1949 |

FOREIGN PATENTS

| Number | Country | Date |
|---|---|---|
| 546,117 | Great Britain | June 29, 1942 |